(12) United States Patent
Ehrenberger et al.

(10) Patent No.: US 7,354,087 B2
(45) Date of Patent: Apr. 8, 2008

(54) LOADING-SPACE PROTECTION DEVICE FOR A MOTOR VEHICLE

(75) Inventors: Marina Ehrenberger, Esslingen (DE); Herbert Walter, Ebersbach (DE)

(73) Assignee: Bos GmbH & Co. KG, Ostfildern (DE)

( * ) Notice: Subject to any disclaimer, the term of this patent is extended or adjusted under 35 U.S.C. 154(b) by 0 days.

(21) Appl. No.: 11/482,507

(22) Filed: Jul. 7, 2006

(65) Prior Publication Data
US 2007/0158967 A1    Jul. 12, 2007

(30) Foreign Application Priority Data
Jul. 8, 2005    (DE)    ...................... 10 2005 032 470

(51) Int. Cl.
*B60R 5/04*    (2006.01)
(52) U.S. Cl. ................ 296/24.43; 296/37.8; 296/37.16
(58) Field of Classification Search ............... 296/24.4, 296/24.43, 37.1, 37.8, 37.16, 98; 160/238, 160/242, 250, 263, 323.1
See application file for complete search history.

(56) References Cited

U.S. PATENT DOCUMENTS

| | | | |
|---|---|---|---|
| 5,618,077 A * | 4/1997 | Ament et al. ............ | 296/37.16 |
| 6,125,908 A * | 10/2000 | Ament et al. ............ | 160/323.1 |
| 6,279,639 B1 * | 8/2001 | Schlecht et al. ............ | 160/23.1 |
| 6,325,436 B1 * | 12/2001 | Ehrenberger et al. ...... | 296/24.4 |
| 6,817,644 B2 * | 11/2004 | Moore ...................... | 296/24.43 |
| 6,913,303 B2 * | 7/2005 | Kobiela et al. ............ | 296/1.01 |
| 7,014,239 B2 * | 3/2006 | Ehrenberger ................ | 296/37.1 |
| 7,048,319 B2 * | 5/2006 | Ament et al. ............ | 296/37.16 |
| 7,055,877 B2 * | 6/2006 | Sparrer et al. ........... | 296/24.43 |

FOREIGN PATENT DOCUMENTS

| | | |
|---|---|---|
| DE | 39 22 450 A1 | 1/1991 |
| DE | 102 38 613 A1 | 3/2004 |
| DE | 103 07 228 A1 | 9/2004 |
| EP | 0 754 594 A2 | 1/1997 |

OTHER PUBLICATIONS

German Patent Office Search Report dated Feb. 16, 2006 (2 pages).
European Patent Office Search Report dated Sep. 29, 2006 (3 pages).

* cited by examiner

*Primary Examiner*—D. Glenn Dayoan
*Assistant Examiner*—Greg Blankenship
(74) *Attorney, Agent, or Firm*—Flynn, Thiel, Boutell & Tanis, P.C.

(57) ABSTRACT

A loading-space protection device includes a holding unit, in which at least one winding shaft for winding up or unwinding a flexible sheet-like structure is mounted, and fastening means for securing the holding unit in a functional position, fixed on the vehicle, in mounts on the vehicle.

Figure 5:
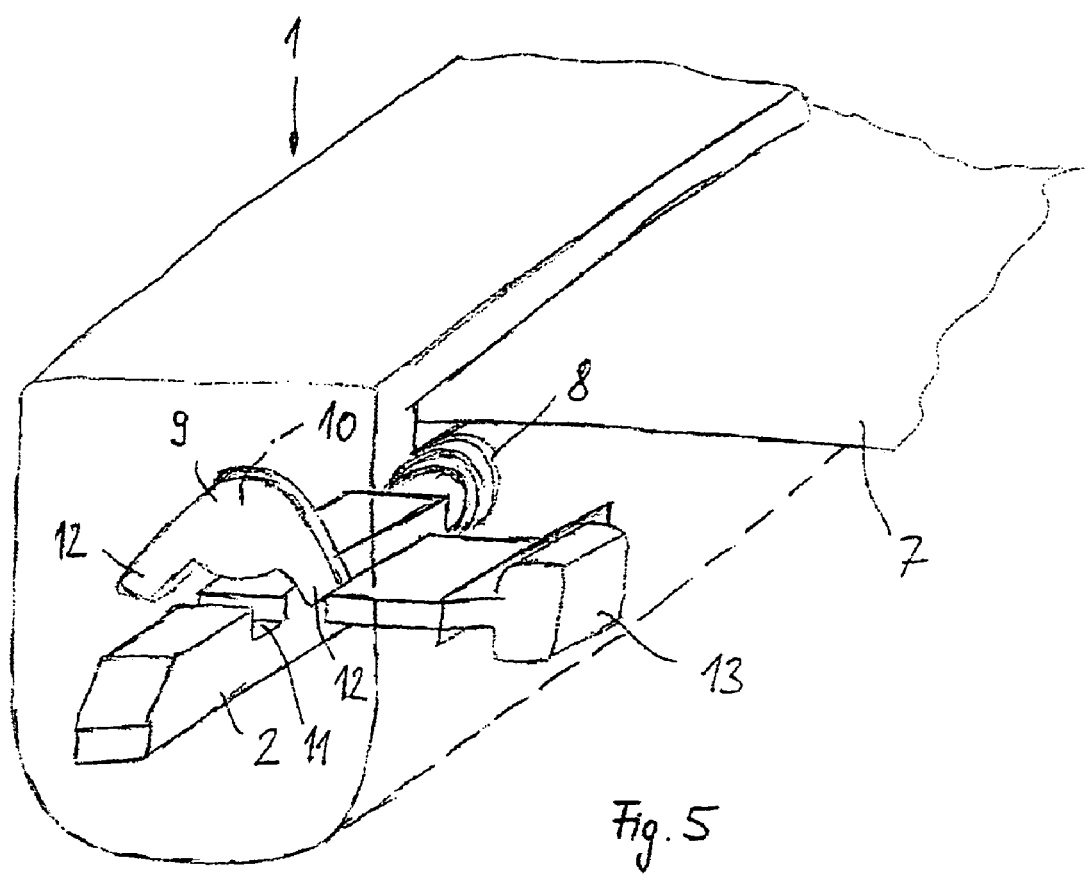

At least one fastening means is assigned at least one securing means which is mounted moveably in the longitudinal direction of the vehicle between a blocking position, which blocks the fastening means in its fastening position within the mount on the vehicle in an interlocking manner, and a rest position, which is disengaged from the fastening means, in such a manner that severe longitudinal accelerations of the vehicle, in particular positive or negative accelerations in the form of a front or rear impact, lead to the securing means being displaced into the blocking position.

9 Claims, 2 Drawing Sheets

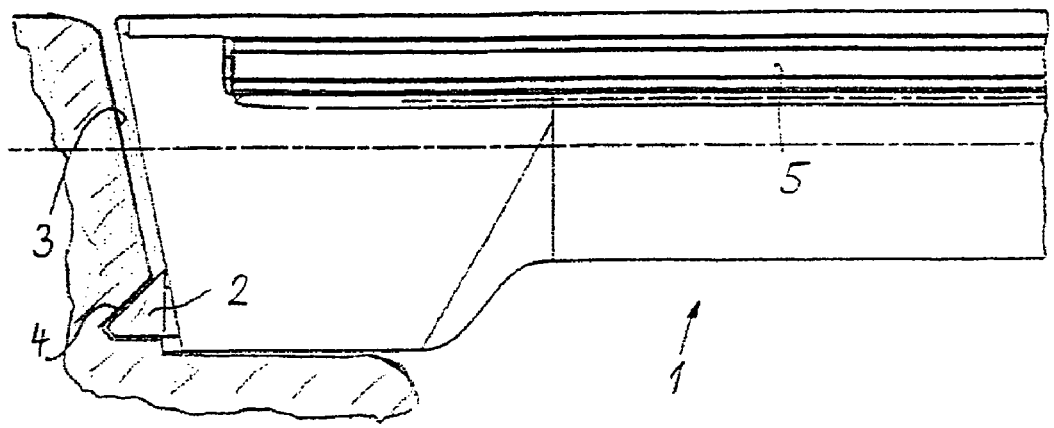
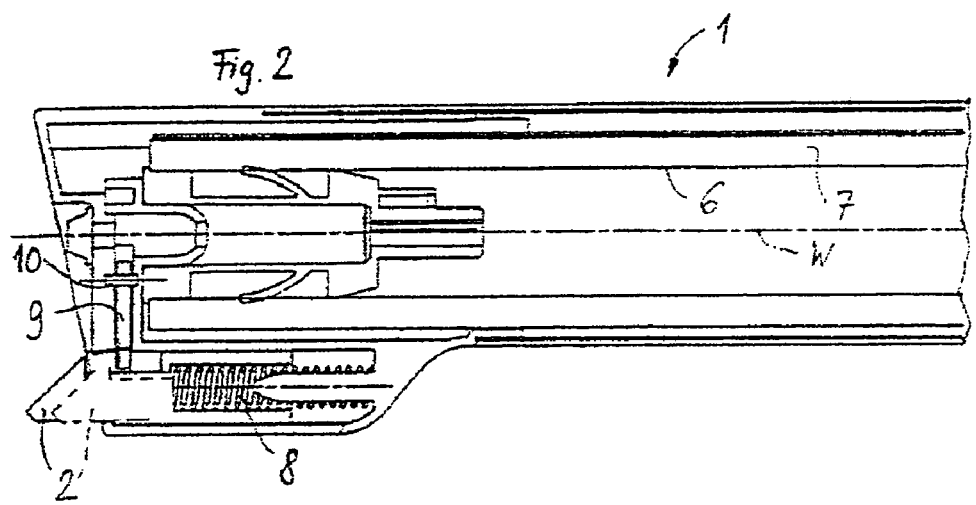
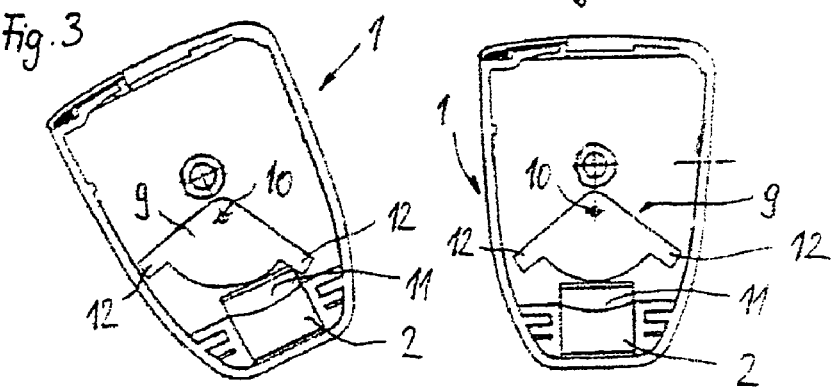

LOADING-SPACE PROTECTION DEVICE FOR A MOTOR VEHICLE

The invention relates to a loading-space protection device for a motor vehicle with a holding unit, in which at least one winding shaft for winding up or unwinding a flexible sheet-like structure is mounted, and which comprises fastening means for securing the holding unit in a functional position, fixed on the vehicle, in mounts on the vehicle.

A loading-space protection device of this type is generally known for station wagons or similar passenger vehicles which have a steeply dropping rear and a loading space, which is open toward the passenger compartment, behind a rear seat bench. Loading-space protection devices of this type usually have a loading-space covering which can be pulled out horizontally and protects the loading space against being looked into from the outside. In addition, or alternatively, the loading-space protection device may comprise a separating net which can be pulled out vertically. To hold the separating net and/or the loading-space covering, the loading-space protection device has a cassette housing which extends over at least virtually the entire width of the loading space in the transverse direction of the vehicle and is fixed in the loading space in mounts, fixed on the vehicle, in the region of side walls of the loading space. The cassette housing may also be removed from the mounts fixed on the vehicle. To fix and release the cassette housing relative to the mounts on the vehicle, fastening means in the form of movable cams or lugs are provided which are arranged movably in the cassette housing, preferably at opposite ends of the cassette housing. The fastening means in conjunction with the mounts on the vehicle secure the cassette housing within the loading space during a normal driving operation. By contrast, in the case of front or rear impact loads, the cassette housing is torn out of the mounts and hurled around the interior of the vehicle. This may cause considerable injury to the vehicle occupants.

It is the object of the invention to provide a loading-space protection device of the type mentioned at the beginning which permits the loading-space protection device to be securely held even in the case of frontal or rear impact loads on the motor vehicle.

This object is achieved in that at least one fastening means is assigned at least one securing means which is mounted movably between a blocking position, which blocks the fastening means in its fastening position within the mount on the vehicle in an interlocking manner, and a rest position, which is disengaged from the fastening means, in such a manner that severe longitudinal accelerations of the vehicle, in particular positive or negative accelerations in the form of a front or rear impact, lead to the securing means being displaced into the blocking position. A holding unit within the context of the invention is to be understood as meaning both a largely closed cassette housing in which at least one flexible sheet-like structure emerges through a corresponding outlet slot, and also housing side parts which support a winding shaft and a sheet-like structure, which is held thereon, essentially open between them. By means of the solution according to the invention, in the event of an appropriate impact load, the holding unit is locked in its installation position in mounts on the vehicle by the at least one fastening means being blocked in its fastening position by the at least one securing means. According to the invention, this additional securing occurs only in the event of a severe positive or negative acceleration, i.e. an acceleration or deceleration, so that, during the normal driving mode or while the motor vehicle is at a standstill, the holding unit can easily be removed from the mounts on the vehicle. The securing means is preferably designed as a mechanically effective blocking element.

In a refinement of the invention, the securing means is mounted in the holding unit. It is thereby possible to accommodate the securing means in a compact manner within the holding unit. The at least one securing means is preferably mounted movably in the interior of the cassette housing serving as the holding unit, and, in the event of a crash, interacts with the at least one fastening means.

In a further refinement of the invention, the securing means is assigned to at least one mount on the vehicle. In this embodiment, the securing means is therefore mounted movably in the loading space, preferably in the region of the at least one mount on the vehicle. The at least one securing means is therefore preferably integrated in at least one of the side walls of the loading space. The mounting of the at least one securing means is preferably connected in a force-transmitting manner to a body shell structure of the motor vehicle in order, in the event of a vehicle impact, to enable the at least one fastening means to be held securely in the mounts on the vehicle by means of the at least one securing means.

In a further refinement of the invention, the securing means is divided into two sections which can be transferred alternately, in mutually opposite directions of movement, into the blocking position. By means of this refinement the securing means is effective in a simple manner both in the case of frontal impact loads and in the case of rear impact loads.

In a further refinement of the invention, the securing means is mounted pivotably eccentrically to its mass center of gravity, and the two sections are aligned mirror-symmetrically to a vertical axis of the securing means. Therefore, as soon as the securing means is deflected from the vertical, namely the vertical axis, by appropriate impact loads in the longitudinal direction of the vehicle, the securing means can always be transferred with the same adjustment distance into its blocking position irrespective of whether there is a rear impact and, accordingly a severe acceleration of the vehicle, or a frontal impact and, accordingly, a severe deceleration of the vehicle.

In a further refinement of the invention, the securing means is guided in a linearly movable manner. The associated fastening means preferably has a corresponding undercut which the securing means engages behind in its blocking position and thus prevents a movement of the fastening means in the release direction. If the securing means is guided in a linearly movable manner, the fastening means is preferably provided with a holding groove which extends in the longitudinal direction of the vehicle, and the securing means is mounted movably in the longitudinal direction of the vehicle in alignment with the holding groove. The securing means is preferably of yoke- or C-like design, with the two limbs of the securing means thus forming the sections which are decisive for the blocking position. In the normal operating position, i.e. in the rest position of the securing means, these limbs are positioned outside the normal path of movement of the fastening means on opposite sides of the holding groove. For this purpose, the securing means can be held in this rest position by means of centering springs, the spring forces of which are in equilibrium and the spring forces of which are configured weakly in comparison to correspondingly acting impact forces. In the case of an appropriate impact load, the securing means is therefore deflected counter to the corresponding spring forces and is displaced relative to the holding groove, so that one of the two limbs engages in the holding groove and thus blocks a movement of the fastening means in the direction of its release position.

In a further refinement of the invention, the securing means is assigned end stops which limit a displacement of the securing means in such a manner that the securing means is in its blocking position in the respective end position. These end stops prevent the securing means, when correspondingly deflected, from being displaced through the blocking position into a further rest position.

In a further refinement of the invention, the sections of the securing means are of cam-like design, and the at least one fastening means has a correspondingly groove-like cutout running in the direction of movement of the sections of the securing means. This creates a corresponding undercut on the fastening means in order to ensure an interlocking connection between securing means and fastening means for the blocking position.

Further advantages and features of the invention emerge from the claims and from the description below of a preferred exemplary embodiment of the invention which is illustrated with reference to the drawings.

FIG. 1 shows, diagrammatically, in a partially broken open excerpt, an embodiment of a loading-space protection device according to the invention in its fastening position relative to a mount on the vehicle, FIG. 2 shows the loading-space protection device according to FIG. 1 in a vertical longitudinal section, FIGS. 3 and 4 show, in a cross section level with the section line III-III, the loading-space protection device according to FIG. 2 in two different positions, the position according to FIG. 3 illustrating the beginning of a blocking position and the position according to FIG. 4 illustrating the rest position of the loading-space protection device, and FIG. 5 shows, in a diagrammatic, perspective illustration, the loading-space protection device according to FIGS. 1 to 4, with functionally relevant parts of the loading-space protection device having been omitted.

A loading-space protection device according to FIGS. 1 to 5 is designed in the form of a horizontal loading-space covering and has a cassette housing 1 which, in its position fitted in the loading space, extends in a basically known manner in the transverse direction of the vehicle approximately over the width of the loading space just below a window-base edge of the vehicle. The cassette housing 1 is preferably positioned directly behind a single- or multi-part rear seat bench of the passenger compartment, the loading space merging above the rear seat bench in an open manner into the passenger compartment. The cassette housing 1 is inserted into holding receptacles 3 on the vehicle which are provided in opposite side wall regions of the loading space, and, according to the exemplary embodiment illustrated, are designed as step-like shoulders into which the cassette housing 1 can be inserted from above and can be placed on a lower supporting surface of the stepped shoulder. In order to be able to fix the cassette housing 1 in the inserted position, at least one latching cutout 4 is provided in the holding receptacle 3 on the vehicle, into which latching cutout at least one latching lug of a fastening means 2 of the cassette housing 1 can enter.

A winding shaft 6 on which a flexible sheet-like structure 7 is fastened in a manner such that it can be wound up and unwound is mounted rotatably in a basically known manner in the cassette housing 1. At its front end in the pull-out direction, the flexible sheet-like structure 7 has a pull-out strip 5 which extends in a dimensionally stable manner over the entire width of the flexible sheet-like structure 7. The winding shaft 6 is mounted rotatably about a winding axis W which extends in the longitudinal direction of the cassette housing 1 and therefore, in the fitted state of the cassette housing 1, extends in the transverse direction of the vehicle.

In the exemplary embodiment illustrated, the cassette housing 1 has respective fastening means 2 on its opposite end regions, with only one fastening means 2 of the one end side being illustrated for clarity reasons. The opposite fastening means 2 and the associated holding receptacle on the vehicle and the corresponding latching cutout of the holding receptacle are of identical design, with the result that reference can be made to the illustration and the associated description of FIGS. 1 to 5 for the opposite end side of the cassette housing 1 too.

In a lower side section of the cassette housing 1, which side section is arranged facing an end of the cassette housing 1 at a distance below the winding shaft, the fastening means 2 in the form of a latching slide is guided in the cassette housing 1 in a linearly movable manner parallel to the winding axis W. The latching slide 2 is spring-loaded laterally to the outside away from the center of the cassette housing 1 and parallel to the winding axis W by means of a helical compression spring 8, so that, in its rest position, it is in its blocking position according to FIGS. 1 and 2. A latching lug of the latching slide 2 and a corresponding run-on slope of the latching cutout 4 are designed in such a manner that, in the case of severe loads in the upward direction on the cassette housing 1, the latching slide 2 can be pressed inward counter to the compressive force of the compression spring 8, as a result of which the cassette housing 1 comes free from the holding receptacle 3. Such a shifting movement of the latching slide 2 inward is illustrated by dashed lines in FIG. 2.

In order to prevent such a shifting movement and accordingly a release of the cassette housing 1 during frontal or rear impact loads on the motor vehicle, the latching slide 2 is assigned a securing means 9 which is designed as a pivoting-cam arrangement. Above its mass center of gravity, the securing means 9 is mounted by means of a bearing pin 10 in a manner such that it can pivot in the cassette housing 1 about a pivot axis parallel to the winding axis W, and has a disk-like form in the manner of a quarter circle. On the opposite flanks of the securing means 9, a respective extension is provided in the form of a cam section 12 which projects beyond the quarter-circle contour radially to the pivot axis of the bearing pin 10. The cam sections 12 are continued until they project into the path of movement of the latching slide 2. The latching slide 2 has a groove-like cutout 11 level with the securing means 9 and therefore in particular level with the cam sections 12, the base of which cutout has a contour in the form of an arc of a circle corresponding to the arc of the pivoting circle of the securing means 9 (can be seen in FIGS. 3 and 4).

The securing means 9 is mounted in a freely pivotable manner on the bearing pin 10 such that it can be deflected relative to the cassette housing 1 and with respect to the vertical and therefore with respect to the vertical axis as a function of inertia. For this purpose, the securing means 9 preferably has a relatively high dead weight, so that, owing to its eccentric suspension and owing to its comparatively high dead weight, it can be deflected relative to the latching slide 2, which is guided within the cassette housing 1, by means of corresponding inertia forces.

With reference to FIG. 5, it can be seen that the latching slide 2 is slidable manually counter to the compressive force of the compression spring 8 by means of a sliding handle 13 projecting out of the cassette housing 1.

In the case of an appropriate impact load on the vehicle, the securing means 9 is inevitably deflected to one side, depending on whether it is a front or rear impact, on account of the severe deceleration or acceleration which occurs in the longitudinal direction of the vehicle, as a result of which one of the two cam sections 12 is pivoted into the groove-like cutout 11 and thus a shifting movement of the latching slide 2 due to the forces occurring between the run-on slope of the latching lug and the corresponding supporting surface of the latching cutout 4 is prevented. Even in the case of a severe inclination of the motor vehicle as a consequence of a vehicle impact or the onset of a rolling over (FIG. 3), the securing means 9 is transferred into its blocking position and therefore secures the cassette housing 1 against being released from the holding receptacles 3 on the vehicle.

The invention claimed is:

1. Loading-space protection device for a motor vehicle, with a holding unit, in which at least one winding shaft for winding up or unwinding a flexible sheet-like structure is mounted, and which comprises fastening means for securing the holding unit in a functional position, fixed on the vehicle, in mounts on the vehicle, wherein at least one fastening means is assigned at least one securing means which is mounted movably in the longitudinal direction of the vehicle between a blocking position, which blocks the fastening means in its fastening position within the mount on the vehicle in an interlocking manner, and a rest position, which is disengaged from the fastening means, in such a manner that severe longitudinal accelerations of the vehicle lead to the securing means being displaced into the blocking position.

2. Loading-space protection device according to claim 1, wherein the securing means is mounted in the holding unit.

3. Loading-space protection device according to claim 1, wherein the securing means is assigned to at least one mount on the vehicle.

4. Loading-space protection device according to claim 1, wherein the securing means is divided into two sections which can be transferred alternately, in mutually opposite directions of movement, into the blocking position.

5. Loading-space protection device according to claim 4, wherein the securing means is mounted pivotably eccentrically to its mass center of gravity, and the two sections are aligned mirror-symmetrically to a vertical axis of the securing means.

6. Loading-space protection device according to claim 1, wherein the securing means is guided in a linearly movable manner.

7. Loading-space protection device according to claim 1, wherein the securing means is assigned end stops which limit a displacement of the securing means in such a manner that the securing means is in its blocking position in the respective end position.

8. Loading-space protection device according to claim 4, wherein the sections of the securing means are of cam-like design, and the at least one fastening means has a correspondingly groove-like cutout running in the direction of movement of the sections of the securing means.

9. Loading-space protection device according to claim 1, wherein said severe longitudinal accelerations of the vehicle are positive or negative accelerations in the form of a front or rear impact.

* * * * *